(12) United States Patent
Bharti et al.

(10) Patent No.: US 11,475,873 B2
(45) Date of Patent: Oct. 18, 2022

(54) TRANSLATING INPUTS FOR VOICE COMMUNICATION

(71) Applicant: International Business Machines Corporation, Armonk, NY (US)

(72) Inventors: Harish Bharti, Pune (IN); Sandeep Sukhija, Sri Ganganagar (IN)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 16/918,060

(22) Filed: Jul. 1, 2020

(65) Prior Publication Data

US 2022/0005456 A1 Jan. 6, 2022

(51) Int. Cl.
*G10L 13/047* (2013.01)
*G06F 3/01* (2006.01)
*G06F 3/16* (2006.01)

(52) U.S. Cl.
CPC ............ *G10L 13/047* (2013.01); *G06F 3/017* (2013.01); *G06F 3/165* (2013.01)

(58) Field of Classification Search
CPC ......... G10L 13/047; G06F 3/017; G06F 3/165
See application file for complete search history.

(56) References Cited

U.S. PATENT DOCUMENTS

| | | | |
|---|---|---|---|
| 9,666,180 B2 * | 5/2017 | Paquier | G10L 21/0216 |
| 2014/0004834 A1 * | 1/2014 | Mian | H04M 1/72469 |
| | | | 455/414.1 |
| 2014/0171047 A1 * | 6/2014 | Mai | H04M 3/566 |
| | | | 455/416 |
| 2014/0258880 A1 | 9/2014 | Holm et al. | |
| 2016/0188292 A1 * | 6/2016 | Carter | G06F 3/167 |
| | | | 704/257 |
| 2019/0130176 A1 | 5/2019 | Maxwell | |

(Continued)

FOREIGN PATENT DOCUMENTS

| | | | | |
|---|---|---|---|---|
| DE | 102017101343 A1 * | 7/2017 | ........... | A61B 5/6803 |
| KR | 1020160097913 A | 8/2016 | | |

OTHER PUBLICATIONS

Horwitz, J., "Microsoft files patent for Finger Band gesture-tracking ring", Oct. 15, 2018, 32 pages.

(Continued)

*Primary Examiner* — James T Tsai
(74) *Attorney, Agent, or Firm* — Kelsey M. Skodje (57) ABSTRACT

A method can include obtaining one or more gesture definitions. Each of the one or more gesture definitions can identify a correspondence between a set of gestures and a voice communication. The method can further include detecting that a mute function of a communication device is active. The mute function can prevent the communication device from transmitting audio data to one or more receiving devices. The method can further include obtaining gesture data from one or more input devices. The method can further include identifying a first gesture definition of the one or more gesture definitions. The identifying the first gesture definition can be based on the gesture data. The method can further include initiating a transfer of a first voice communication to the one or more receiving devices. The first voice communication can correspond to the first gesture definition.

19 Claims, 5 Drawing Sheets

(56) References Cited

U.S. PATENT DOCUMENTS

2019/0315227 A1* 10/2019 Kim ...................... B60K 35/00

OTHER PUBLICATIONS

Anonymous, "Headphone Gesture Detection for Online Social Communications and Meetings", An IP.com Prior Art Database Technical Disclosure, IP.com No. IPCOM000243591D, IP.com Electronic Publication Date: Oct. 4, 2015, 4 pages.

Mell et al., "The NIST Definition of Cloud Computing", Recommendations of the National Institute of Standards and Technology, Sep. 2011, 7 pages.

* cited by examiner

TRANSLATING INPUTS FOR VOICE COMMUNICATION

BACKGROUND

The present disclosure relates to voice communication, and more specifically, to translating inputs for voice communication.

Communication devices, such as mobile phones and tablet computers, can include multiple tools to facilitate communication. Examples of such tools include a text-to-speech application for converting a text message to a voice communication; a speech-to-text application for converting a voice communication to text, and a video conferencing application for providing real-time video communication.

SUMMARY

According to embodiments of the present disclosure, a method can include obtaining one or more gesture definitions. Each of the one or more gesture definitions can identify a correspondence between a set of gestures and a voice communication. The method can further include detecting that a mute function of a communication device is active. The mute function can prevent the communication device from transmitting audio data to one or more receiving devices. The method can further include obtaining gesture data from one or more input devices. The obtaining the gesture data can be in response to the detecting. The method can further include identifying a first gesture definition of the one or more gesture definitions. The identifying the first gesture definition can be based on the gesture data. The method can further include initiating a transfer of a first voice communication to the one or more receiving devices. The first voice communication can correspond to the first gesture definition.

A system and a computer program product corresponding to the above method are also included herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to voice communication; more particular aspects relate to translating inputs for voice communication. While the present disclosure is not necessarily limited to such applications, various aspects of the disclosure may be appreciated through a discussion of various examples using this context.

Communication devices, such as mobile phones and tablet computers, can include multiple tools to facilitate communication. Examples of such tools include a text-to-speech application for converting a text message to a voice communication; a speech-to-text application for converting a voice communication to texts, and a video conferencing application for providing real-time video communication. While tools such as these can provide a variety of communication methods, they can have shortcomings.

For example, in some instances, a user may need to use a mobile phone to participate in a conference call while the user is in a noisy environment, such as an airport. In this example, the user can activate a mute function of the mobile phone while listening to the conference call dialogue. However, to share comments during the conference call, the user may need to deactivate the mute function so that the user's voice communication into the mobile phone can be heard by the other participants to the conference call. In this example, deactivating the mute function can permit the mobile phone to transmit ambient noise from the airport, which can impede the other participants' ability to understand the user's comments and/or disrupt the conference call. Additionally in this example, the other participants can be using a device such as a conferencing telephone to host the conference call. The conferencing telephone may not be configured to receive a text message from the user's mobile phone; thus, the user may have difficulty sharing his or her comments in the conference call without deactivating the mute function of the user's mobile phone.

To address these and other challenges, embodiments of the present disclosure include an input translation system. In some embodiments, the input translation system can obtain an input and translate the input to a voice communication that can be transferred to a receiving device. In some embodiments, the input can be gesture data corresponding to a set of gestures. In some embodiments, the input can be a text message. In some embodiments, the input translation system can perform operations while a mute function of a communication device is active. In some embodiments, the input translation system can obtain gesture data from one or more input devices. In some embodiments the voice communication can be based on user-defined gesture definitions.

Accordingly, embodiments of the present disclosure can allow a user to engage in voice dialogue with one or more participants to a phone call while a mute function of the user's communication device is active. Additionally, by translating inputs to voice communications, embodiments of the present disclosure do not require a receiving device to be configured to receive text messages and/or video data. Thus, embodiments of the present disclosure can be operable with receiving devices having text message and/or videoconferencing functionality as well as receiving devices not having such functionality. As discussed in further detail below, embodiments of the present disclosure can allow a user to tailor, according to the user's environment and/or circumstances, the manner in which the user engages in voice communication.

Figure 1:
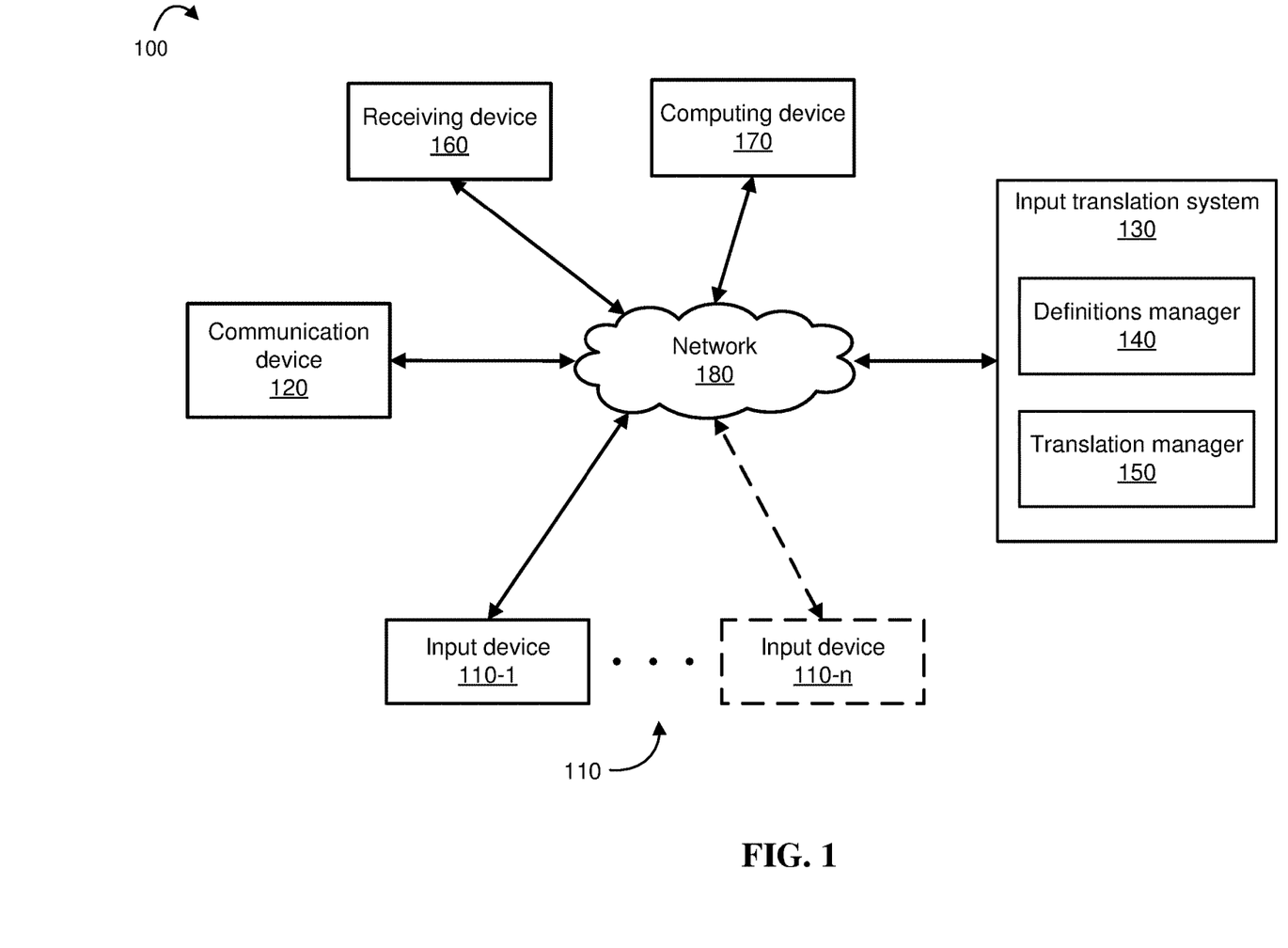
FIG. 1 depicts an example computing environment having an input translation system, in accordance with embodiments of the present disclosure.

Turning to the figures, FIG. 1 illustrates a computing environment 100 that includes one or more of each of an input translation system 130, a set of input devices 110, a communication device 120, a receiving device 160, a computing device 170, and/or a network 180. In some embodiments, at least one input translation system 130, set of input devices 110, communication device 120, receiving device 160, and/or computing device 170 can exchange data with at least one other through the at least one network 180. For example, in some embodiments, at least one input translation system 130 can exchange data with at least one set of input devices 110 through the at least one network 180. One or more of each of the one input translation system 130, set of input devices 110, communication device 120, receiving device 160, computing device 170, and/or network 180 can include a computer system, such as the computer system 301 discussed with respect to FIG. 3.

In some embodiments, the input translation system 130 can be included in software installed on a computer system of at least one of the set of input devices 110, communication device 120, and/or computing device 170. For example, in some embodiments, the input translation system can be included as a plug-in software component of software installed on the communication device 120. The input translation system 130 can include program instructions implemented by a processor, such as a processor of the communication device 120, to perform one or more operations discussed with respect to FIG. 2.

In some embodiments, the input translation system 130 can include one or more modules, such as definitions manager 140 and/or translation manager 150. In some embodiments, the definitions manager 140 and the translation manager 150 can be integrated into a single module. In some embodiments, the definitions manager 140 can obtain, manage, store, and/or initiate storage of gesture definitions. In some embodiments, the translation manager 150 can interpret and analyze gestures and manage voice communications. In some embodiments, one or more of the definitions manager 140 and/or the translation manager 150 can include program instructions implemented by a processor, such as a processor of the communication device 120, to perform one or more operations discussed with respect to FIG. 2. For example, in some embodiments, the definitions manager 140 can include program instructions to perform operations 205 and 240-260, FIG. 2. In some embodiments, the translation manager 150 can include program instructions to perform operations 210-235, FIG. 2. In some embodiments, the input translation system can include and/or employ software for image analysis, speech synthesis, and/or text-to-speech operations.

In some embodiments, the set of input devices 110 can include one or more input devices. For example, in some embodiments, the set of input devices 110 can include n input devices, where n is an integer greater than zero. For example, n=1 in embodiments in which the set of input devices 110 includes only a first input device 110-1; n=2 in embodiments in which the set of input devices 110 includes two input devices (a first input device 110-1 and a second input device 110-2); and so on.

In some embodiments, the set of input devices 110 can include one or more devices configured to transmit gesture data (discussed below) to the input translation system 130. In some embodiments, the set of input devices can include one or more devices, such as a communication device 120, smart ring, smart contact lens, and/or smart shoe (discussed with respect to FIG. 2, below).

In some embodiments, the communication device 120 can include a device configured to permit voice communication with one or more receiving devices 160. For example, in some embodiments, the communication device 120 can include a device such as a mobile phone, tablet, and/or laptop computer. In some embodiments, the communication device 120 can include components (not shown) such as a keyboard, touch screen, camera, speaker, and/or microphone having a mute function. In some embodiments, the communication device 120 can include and/or employ software for image analysis, speech synthesis, and/or text-to-speech operations.

In some embodiments, the receiving device 160 can include a device configured to permit voice communication with a communication device 120. In some embodiments, the receiving device 160 can receive one or more voice communications transferred from one or more of the input translation system 130, communication device 120, and/or computing device 170. In some embodiments, the receiving device 160 can include a device such as a landline telephone, conference speakerphone, mobile phone, and/or computer. In some embodiments, the receiving device can be configured to receive text messages and/or video data. In some embodiments, the receiving device may not be configured to receive text messages and/or video data.

In some embodiments, the computing device 170 can include a device configured to store data (e.g., one or more gesture definitions), process data, and/or implement program instructions. For example, in some embodiments, the computing device 170 can include a device such as a computer and/or a web server. In some embodiments, the computing device 170 can include and/or employ software for image analysis, speech synthesis, and/or text-to-speech operations.

In some embodiments, the network 180 can be a wide area network (WAN), a local area network (LAN), the internet, or an intranet. In some embodiments, the network 180 can be substantially similar to, or the same as, cloud computing environment 50 discussed with respect to FIG. 4.

Figure 2:
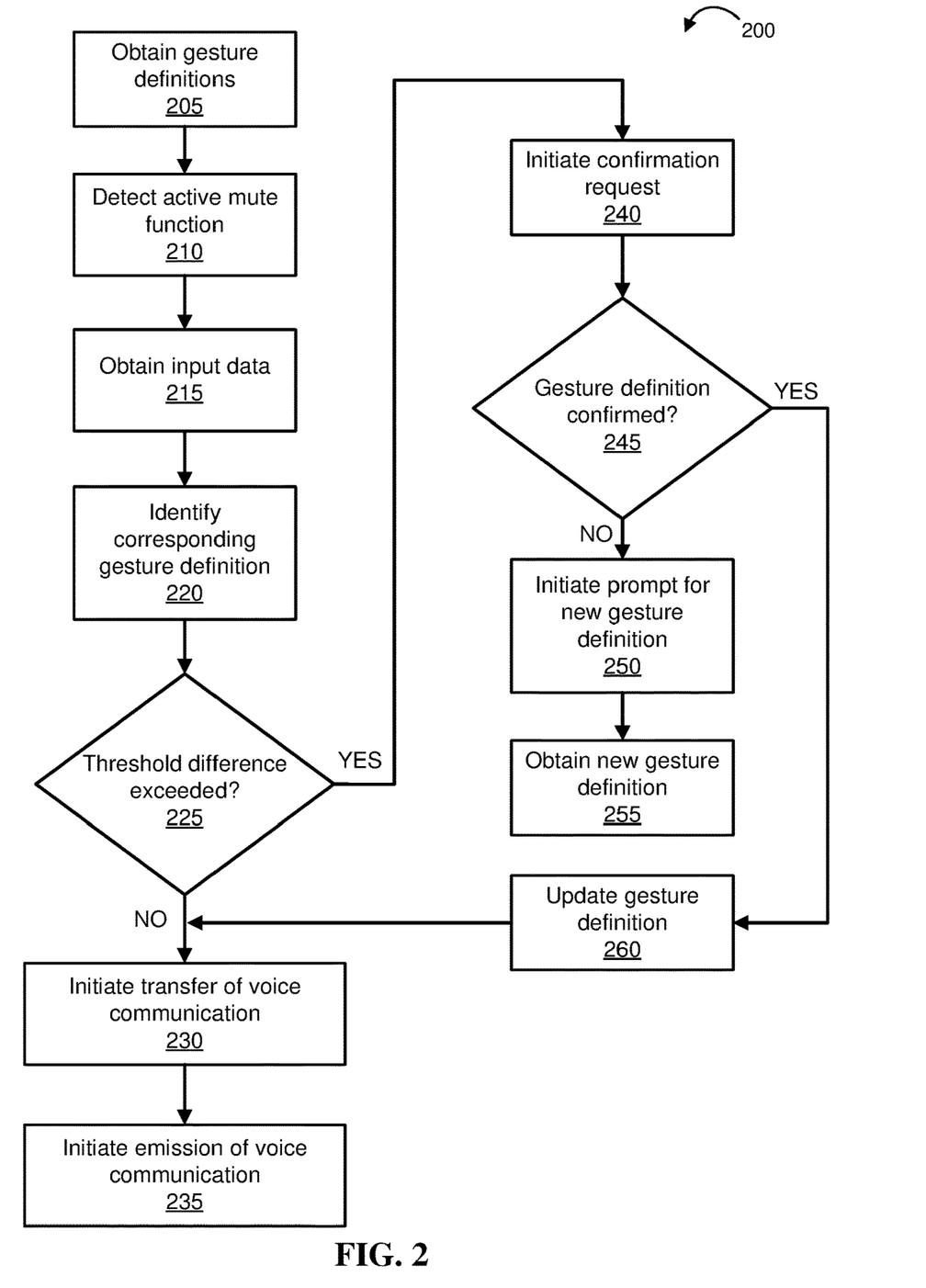
FIG. 2 depicts a flowchart of an example method for translating inputs for voice communication, in accordance with embodiments of the present disclosure.

FIG. 2 illustrates a flowchart of an example method 200 for translating inputs for voice communication, in accordance with embodiments of the present disclosure. Method 200 can be performed by an input translation system, such as the input translation system 130, FIG. 1.

Referring back to FIG. 2, in operation 205, the input translation system can obtain one or more gesture definitions. A gesture definition can refer to data that identifies a correspondence between a set of gestures and a voice communication. For example, in some embodiments, a gesture definition can include an electronic table or database that stores gesture data and voice communications that correspond to the gesture data. A set of gestures can refer to one or more motions of an input device and/or one or more motions by a user that are obtained by an input device. For example, in some embodiments, a mobile phone can be an input device, and a set of gestures can include a user moving the mobile phone in a particular manner, such as shaking the mobile phone twice. Gesture data can refer to information that can describe and/or represent a set of gestures performed by a user. In some embodiments, gesture data can include information such as coordinates, sensor data, images, and/or alphanumeric text. Continuing with the example of the user shaking the mobile phone twice, gesture data related to that set of gestures (i.e., shaking the mobile phone twice) can include data from an accelerometer included in the mobile phone. In this example, the input translation system can detect, based on the accelerometer data, that the mobile phone has been shaken twice. For example, in some embodiments, the input translation system can obtain the accelerometer data and determine that the accelerometer data matches signature accelerometer data for a mobile phone that has been shaken twice.

A voice communication can refer to audio data corresponding to spoken communication. For example, in some embodiments, a voice communication can include a digital recording of a message spoken by a user. In some embodiments, a voice communication can include an electronic file containing artificially generated human speech, such as speech synthesized by a computing device. In some embodiments, a set of gestures can correspond to a voice communication when gesture data related to the set of gestures is stored such that it can indicate the voice communication. For example, continuing with the example of the user shaking the mobile phone twice, gesture data related to that set of gestures (i.e., shaking the mobile phone twice) can be stored in a database of gesture definitions. Such a database of gesture definitions can be made up of gesture data that indicates respective voice communications. Accordingly, the input translation system, in response to obtaining gesture data, can employ the database of gesture definitions to identify a respective voice communication. In this example, the gesture data related to the mobile phone being shaken twice can indicate the voice communication, "I understand." Thus, as discussed in further detail below, in response to obtaining the gesture data related to the mobile phone being shaken twice, the input translation system can initiate a transfer of the voice communication, "I understand," to one or more receiving devices.

In some embodiments, the input translation system can obtain one or more gesture definitions by user input. For example, in some embodiments, a user can activate a training mode of the input translation system. During such a training mode, the user can input gesture data and one or more voice communications into the input translation system. For example, in some embodiments, the user can employ a communication device (e.g., a mobile phone) to input gesture data and corresponding voice communications into a gesture definitions database of the input translation system. In this example, the input translation system can include a software interface on the user's mobile phone. Continuing with this example, using the software interface, the user can generate a gesture definition by inputting gesture data (e.g., using a camera of the mobile phone to capture an image of the user's thumb in an upward position) and inputting a corresponding voice communication (e.g., using a microphone of the mobile phone to record the user speaking the word "Yes"). The input translation system can store such a definition in a database. For example, a database of the input translation system can include TABLE 1.

TABLE 1

| Definition | Gesture data | Voice communication |
|---|---|---|
| 1 | Phone movement from one ear to another | Sorry, didn't hear. Kindly repeat the last sentence. |
| 2 | Draw H with one dot on phone screen | Hold on for a minute. |
| 3 | Draw H with two dots on phone screen | Hold on for two minutes please. |
| 4 | Showing left thumb upwards to phone camera | Yes. |

TABLE 1-continued

| Definition | Gesture data | Voice communication |
|---|---|---|
| 5 | Showing left thumb downwards to phone camera | No. |
| 6 | Shake phone twice | I understand. |
| 7 | Shake phone three times | I don't understand. |

TABLE 1 shows seven example gesture definitions. For clarity, the gesture data included in TABLE 1 is formatted as a written description of a set of gestures. However, in some embodiments, gesture data can include information such as coordinates, sensor data, images, and/or alphanumeric text. Similarly, while TABLE 1 shows voice communications as text messages, in some embodiments, voice communications can include one or more electronic files, such as audio files, containing spoken recordings of the shown text messages. For example, the voice communication for gesture definition 7 can include an audio recording of the user speaking the words, "I don't understand."

By allowing a user to generate gesture definitions, embodiments of the present disclosure can allow the user to customize the gesture definitions to accommodate his or her usage of the input translation system. For example, a user intending to employ the input translation system in an auto repair shop environment can generate gesture definitions that include gestures that can be performed without touching a communication device, such as a mobile phone. In this way, the user can employ the input translation system to communicate without exposing the communication device to automotive fluids, such as motor oil, that may be covering the user's hands. Continuing with the auto repair shop example, the user can include voice communications that may be relevant to auto repair tasks.

In some embodiments, the user can activate a training mode of the input translation system by performing a training mode gesture. The training mode gesture can be a gesture that indicates to the input translation system that the user intends to activate a training mode. For example, a training mode gesture can be a user placing his or her right hand in front of a camera of the user's mobile phone. In response to obtaining the training mode gesture, the input translation system can activate a training mode of the input translation system such that a user can input one or more gesture definitions. In some embodiments, a training mode gesture can be user-defined. In some embodiments, a training mode gesture can be a default gesture that the input translation system is configured to recognize as a training mode gesture.

In some embodiments, the input translation system can obtain one or more gesture definitions from a source such as a web server. In some embodiments the one or more gesture definitions can be generated by an entity other than the user, such as a third-party company. For example, in some embodiments, such a third-party company can provide a set of gesture definitions that the user can select and employ in an input translation system.

In operation 210, the input translation system can detect that a mute function of a communication device is active. In some embodiments, a mute function can include a program instruction of the communication device that can prevent the communication device from transmitting audio data to one or more receiving devices. For example, in some embodiments, a communication device, such as a tablet computer, can include a mute function. In this example, the mute function can include a program instruction to stop transmission of audio data from a microphone of the communication device. Thus, in this example, in response to an active mute function of the tablet computer, the tablet computer can be blocked from transmitting audio data corresponding to sounds (e.g., sound waves from speech and/or ambient noises) that reach a microphone of the tablet computer. In some embodiments, operation 210 can include the input translation system obtaining data from a communication device, such data indicating that a mute function of the communication device is active.

In operation 215, in response to performing operation 210, the input translation system can obtain input data. In some embodiments, input data can include gesture data. In some embodiments, the input translation system can obtain gesture data from one or more input devices, such as input devices 110, FIG. 1. For example, in some embodiments, gesture data can include information from a wearable technology device, such as a "smart ring," "smart contact lens," and/or "smart shoe." For example, in some embodiments, a smart ring can be jewelry item that is configured to track and transmit information about its position and movements. Continuing with this example, a user, wearing such a smart ring on the user's finger, can perform a gesture, such as moving his or her hand, including the smart ring, in a circular direction. In response, the smart ring can track the coordinates of the circular motion and transmit such gesture data to the input translation system.

In another example, in some embodiments, gesture data can include information from a device such as a "smart contact lens." In this example, the smart contact lens can be worn as a contact lens by a user. Additionally in this example, the smart contact lens can be configured to track and transmit information about a user's gestures, such as a direction of the user's eye movements, a quantity and/or pattern of blinks by the user, and/or objects gazed upon by the user. In this example, the smart contact lens can transmit such gesture data to the input translation system.

In another example, in some embodiments, gesture data can include information from a device such as a "smart shoe." In this example, the smart shoe can be configured to track and transmit information about a user's gestures while the user wears the smart shoe. For example, in some embodiments, the smart shoe can be configured to track gesture data such as coordinates of motion of the user's foot, a number of steps taken by a user, and/or a number of times the user's foot contacts a surface. In this example, the smart shoe can transmit such gesture data to the input translation system.

As discussed above, in some embodiments, a communication device can be an input device. Thus, in some embodiments, gesture data can include information transmitted from a communication device to the input translation system. Such gesture data can include information such as measurements of a mobile phone accelerometer indicating a number of times the mobile phone is shaken; images of a camera of a laptop computer showing a user's hand with a thumb pointed upward; and/or coordinates corresponding to a shape traced onto a screen of a tablet computer.

In some embodiments, input data can include one or more text messages from a communication device. For example, in some embodiments, in operation 215, in response to performing operation 210, the input translation system can obtain one or more text messages from a communication device. In these embodiments, the input translation system can proceed to operation 230, discussed below.

In some embodiments, in operation 215, the input translation system can obtain input data from at least two input devices. For example, in some embodiments, the input translation system can obtain first gesture data from a first input device, such as a mobile phone, and the input translation system can obtain second gesture data from a second input device, such as a smart ring. In this way, the input translation system can allow a user to adjust his or her gestures according to his or her circumstances.

For example, in some embodiments, a user at a manufacturing site can participate in a phone call with an off-site technician. In this example, the off-site technician can be providing the user oral instructions for replacing a machine component. Continuing with this example, with the user's mobile phone (i.e., a first input device), the user can capture an image of his or her thumb pointing upward (i.e., first gesture data) to indicate the voice communication, "yes." Additionally in this example, with the user's smart shoe (i.e., a second input device), the user can stomp on the floor twice to indicate the voice communication, "yes." In this example, in response to the user's gesture of stomping on the floor twice, a sensor in the user's smart shoe can transmit second gesture data to the input translation system indicating such a gesture. Continuing with this example, during the phone call, the user can initially use the first input device for transmitting voice communication to the off-site technician. However, at a subsequent time, an instruction from the off-site technician for replacing the machine component can require that both of the user's hands be occupied. Under such circumstances, the user can be unable to use the first input device to maintain voice communication with the off-site technician. However, the user can use the second input device to maintain such voice communication (e.g., the user can stomp on the floor with the smart shoe, although the user is not able to capture a thumb-upward gesture with the user's mobile phone). Accordingly, embodiments of the present disclosure can allow a user to maintain voice communication while adapting to changed circumstances, such as circumstances that can restrict the user's mobility.

In operation 220, the input translation system can identify a gesture definition corresponding to gesture data obtained in operation 215. In some embodiments, operation 220 can include the input translation system comparing gesture data obtained in operation 215 to one or more gesture definitions obtained in operation 205 and identifying one or more matches. For example, in some embodiments, a first gesture definition associated with a smart contact lens can include that gesture data representing a user blinking twice indicates the voice communication "Please continue." Continuing with this example, a second gesture definition associated with the smart contact lens can include that gesture data representing a user blinking three times indicates the voice communication "Please pause." In this example, in response to obtaining, in operation 215, gesture data representing a user blinking twice, the input translation system can, in operation 220, compare such obtained gesture data to the first and second gesture definitions and identify a match between the obtained gesture data and the first gesture definition.

In some embodiments, in operation 220, the input translation system can identify two or more gesture definitions corresponding to the gesture data obtained in operation 215. For example, in some embodiments, a first gesture definition associated with a smart ring can include a first set of coordinates as first gesture data. In this example, the first set of coordinates can represent a user tracing a horizontal line in space. For example, the user, while wearing the smart ring on the user's hand, can move his or her hand horizontally from a left-side position to a right-side position. The first set of coordinates can represent such motion. In this example, the first gesture data can indicate the voice communication, "I agree." Continuing with this example, a second gesture definition associated with the smart ring can include a second set of coordinates as second gesture data. In this example, the second set of coordinates can represent a user tracing a diagonal line in space. For example, the user, while wearing the smart ring on the user's hand, can move his or her hand downward and at an angle from an upper, left-side position to a lower, right-side position. The second set of coordinates can represent such motion. In this example, the second gesture data can indicate the voice communication, "I'd like to discuss that further." Continuing with this example, while wearing the smart ring, the user can trace a line that partially resembles a horizontal line and partially resembles a diagonal line. Accordingly, the input translation system can identify both the first gesture definition and the second gesture definition as corresponding to gesture data it obtains from the smart ring. Additionally, such gesture data obtained by the input translation system from the smart ring can exhibit a difference from both the first gesture data and the second gesture data. For example, a slope associated with the obtained gesture data can exhibit a 20% difference from a slope associated with the first gesture data and can exhibit a 25% difference from a slope associated with the second gesture data.

In operation 225, the input translation system can determine whether gesture data obtained in operation 215 exceeds a threshold difference from the one or more of the corresponding gesture definitions identified in operation 220. In some embodiments, operation 225 can include the input translation system performing comparisons using one or more thresholds. In some embodiments, the one or more thresholds can be selected and input into the input translation system by an entity, such as a user or a programmer of the input translation system. In some embodiments, the one or more thresholds can be determined by the input translation system based on feedback from a user, such as feedback obtained in operation 245 discussed below. In operation 225, if the input translation system determines that the one or more thresholds are exceeded, then the input translation system can proceed to operation 240. Alternatively, if the input translation system determines that the one or more thresholds are not exceeded, then the input translation system can proceed to operation 230.

In an example, continuing with the partial horizontal line example discussed above, in operation 225, the input translation system can employ for comparison a threshold of a 10% difference between obtained gesture data and gesture data of a gesture definition. In this example, since the obtained gesture data exhibits a 20% difference from a slope associated with the first gesture data and exhibits a 25% difference from a slope associated with the second gesture data, the threshold is exceeded. Thus, in this example, the input translation system can proceed to operation 240.

In operation 230, the input translation system can initiate a transfer of a voice communication of a gesture definition to one or more receiving devices. In some embodiments, the voice communication for which the input translation system initiates a transfer can correspond to a gesture definition identified in operation 220. In some embodiments, the input translation system can initiate a transfer of a voice communication in response to identifying a gesture definition in operation 220. In some embodiments, operation 230 can include the input translation system transmitting one or more voice communications to one or more receiving devices. In some embodiments, operation 230 can include the input translation system issuing a command to a communication device and/or a computing device to transmit one or more voice communications to one or more receiving devices.

For example, continuing with the off-site technician example discussed above, during the phone call, the user can desire to answer "yes" to a question from the off-site technician. In response to the user stomping on the floor twice while wearing a smart shoe, the input translation system can identify a gesture definition corresponding to the gesture data representing the user stomping on the floor twice. In this example, the gesture definition can include the voice communication "yes." This voice communication can be a stored recording of the user speaking the word "yes." Accordingly, in operation 230, the input translation system can transmit the sound of the stored recording to the receiving device (e.g., a telephone) used by the off-site technician to participate in the phone call. Thus, from the off-site technician's receiving device, the off-site technician can hear the sound of the user speaking the word "yes." This example illustrates a manner in which embodiments of the present disclosure can allow a user to engage in voice communication using gestures.

In some embodiments, operation 230 can include the input translation system using text-to-speech technology to generate one or more voice communications based on one or more text messages obtained from a communication device in operation 215. In these embodiments, operation 230 can further include the input translation system initiating a transfer of the one or more voice communications to one or more receiving devices.

In operation 235, the input translation system can initiate an emission of the voice communication from a communication device. In some embodiments, operation 235 can include the input translation system emitting the voice communication from the communication device. In some embodiments, operation 230 can include the input translation system issuing a command to a communication device and/or a computing device to emit the voice communication from the communication device. For example, in some embodiments, the input translation system can cause a speaker of the communication device to project an audible sound of the voice communication. In some embodiments, the input translation system can perform operation 235 in response to identifying a gesture definition in operation 220.

Operation 235 can allow a user to hear the voice communication transferred in operation 230. For example, continuing with the off-site technician example discussed above, in operation 235 the input translation system can emit the sound of the user speaking the word "yes" from the user's communication device. In this example, operation 235 can allow the user to verify that the input translation system correctly interpreted the user's two-stomp gesture and transmitted the correct voice communication to the off-site technician's receiving device. Thus, according to embodiments of the present disclosure, operation 235 can facilitate accurate voice communication using gestures.

In operation 240, the input translation system can initiate a confirmation request regarding one or more gesture definitions identified in operation 220. In some embodiments, operation 240 can include the input translation system prompting a user to confirm whether a gesture definition identified in operation 220 includes the voice communication that the user intends to be transferred to one or more receiving devices. For example, continuing with the partial horizontal line example discussed above, in operation 240, the input translation system can include a software interface on a communication device (e.g., a mobile phone) of the user. In this example, through the software interface, the input translation system can present the first gesture definition to the user. Additionally, through the software interface, the input translation system can request that the user select whether the first gesture definition indicates the voice communication that the user intends to be transferred.

In operation 245, the input translation system can determine whether a gesture definition presented in operation 240 is confirmed. If the input translation system determines that such a gesture definition is confirmed, then the input translation system can proceed to operation 260. Alternatively, if the input translation system determines that such a gesture definition is not confirmed, then the input translation system can proceed to operation 250.

In operation 260, the input translation system can update a gesture definition confirmed in operation 245. In some embodiments, operation 260 can include the input translation system modifying gesture data of a gesture definition. For example, continuing with the partial horizontal line example discussed above, in response to obtaining a confirmation of the first gesture definition (i.e., a confirmation that the user intended to trace a horizontal line and to transfer the voice communication, "I agree"), the input translation system can modify the first gesture data (i.e., the first set of coordinates) of the first gesture definition. Continuing with this example, in some embodiments, the modification can include adding to the first gesture definition the coordinates obtained from the user's smart ring gesture (i.e., the coordinates corresponding to the traced line that partially resembles a horizontal line and partially resembles a diagonal line). In this way, embodiments of the present disclosure can learn and adapt to deviations in a user's gestures, and thus, improve translation accuracy over time.

In operation 250, the input translation system can initiate a prompt for a new gesture definition. For example, continuing with the partial horizontal line example discussed above, the input translation system, through the software interface, can permit a user to activate a training mode of the input translation system. In some embodiments, in operation 255, the input translation system can obtain such a new gesture definition in a manner that is identical or substantially similar to a process discussed with respect to operation 205. In this way, embodiments of the present disclosure can permit a user to input a new gesture definition at a variety of times, according to the user's preference.

Figure 3:
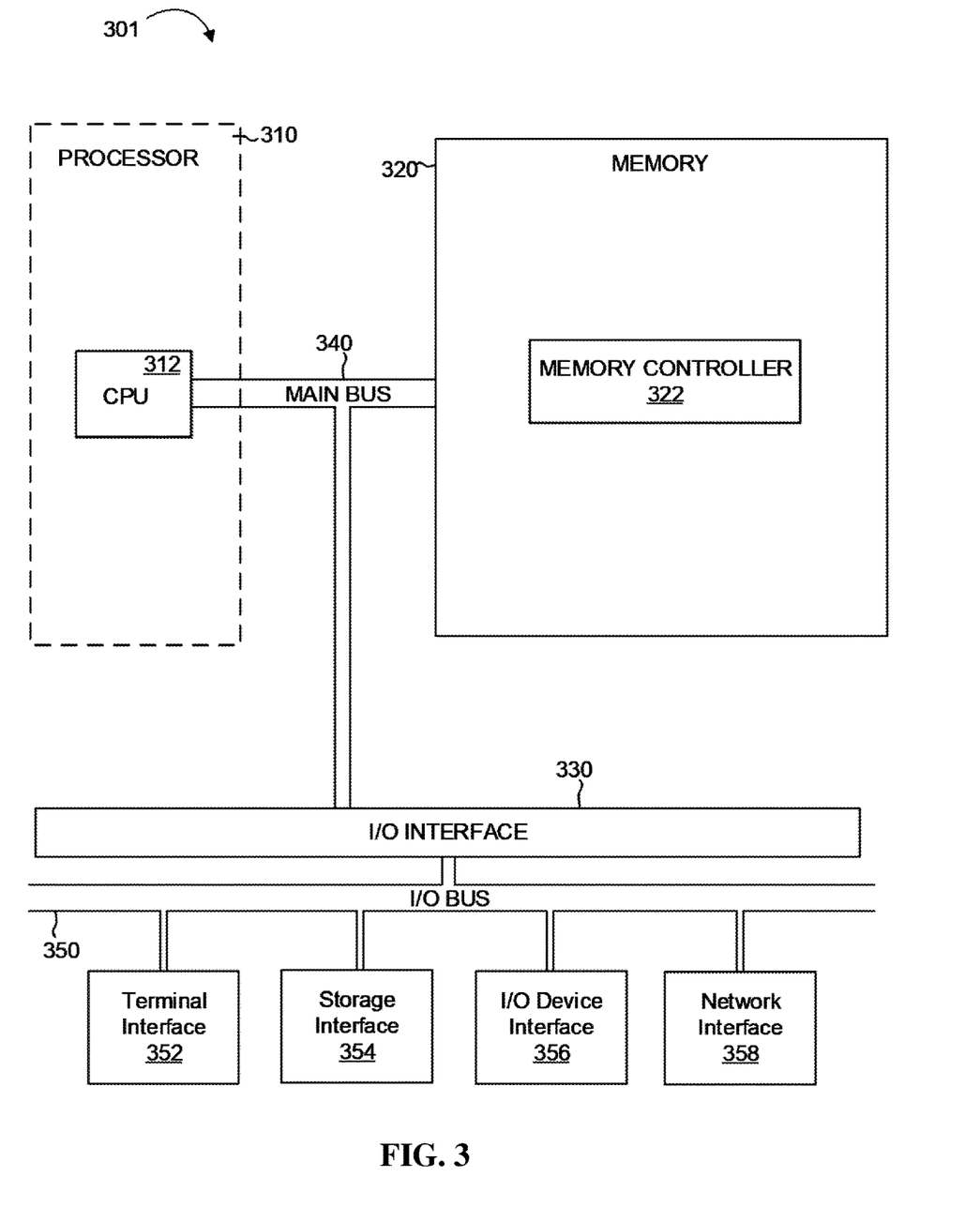
FIG. 3 depicts the representative major components of a computer system that can be used in accordance with embodiments of the present disclosure.

FIG. 3 depicts the representative major components of an exemplary Computer System 301 that can be used in accordance with embodiments of the present disclosure. The particular components depicted are presented for the purpose of example only and are not necessarily the only such variations. The Computer System 301 can comprise a Processor 310, Memory 320, an Input/Output Interface (also referred to herein as I/O or I/O Interface) 330, and a Main Bus 340. The Main Bus 340 can provide communication pathways for the other components of the Computer System 301. In some embodiments, the Main Bus 340 can connect to other components such as a specialized digital signal processor (not depicted).

The Processor 310 of the Computer System 301 can be comprised of one or more CPUs 312. The Processor 310 can additionally be comprised of one or more memory buffers or caches (not depicted) that provide temporary storage of instructions and data for the CPU 312. The CPU 312 can perform instructions on input provided from the caches or from the Memory 320 and output the result to caches or the Memory 320. The CPU 312 can be comprised of one or more circuits configured to perform one or more methods consistent with embodiments of the present disclosure. In some embodiments, the Computer System 301 can contain multiple Processors 310 typical of a relatively large system. In other embodiments, however, the Computer System 301 can be a single processor with a singular CPU 312.

The Memory 320 of the Computer System 301 can be comprised of a Memory Controller 322 and one or more memory modules for temporarily or permanently storing data (not depicted). In some embodiments, the Memory 320 can comprise a random-access semiconductor memory, storage device, or storage medium (either volatile or nonvolatile) for storing data and programs. The Memory Controller 322 can communicate with the Processor 310, facilitating storage and retrieval of information in the memory modules. The Memory Controller 322 can communicate with the I/O Interface 330, facilitating storage and retrieval of input or output in the memory modules. In some embodiments, the memory modules can be dual in-line memory modules.

The I/O Interface 330 can comprise an I/O Bus 350, a Terminal Interface 352, a Storage Interface 354, an I/O Device Interface 356, and a Network Interface 358. The I/O Interface 330 can connect the Main Bus 340 to the I/O Bus 350. The I/O Interface 330 can direct instructions and data from the Processor 310 and Memory 320 to the various interfaces of the I/O Bus 350. The I/O Interface 330 can also direct instructions and data from the various interfaces of the I/O Bus 350 to the Processor 310 and Memory 320. The various interfaces can comprise the Terminal Interface 352, the Storage Interface 354, the I/O Device Interface 356, and the Network Interface 358. In some embodiments, the various interfaces can comprise a subset of the aforementioned interfaces (e.g., an embedded computer system in an industrial application may not include the Terminal Interface 352 and the Storage Interface 354).

Logic modules throughout the Computer System 301—including but not limited to the Memory 320, the Processor 310, and the I/O Interface 330—can communicate failures and changes to one or more components to a hypervisor or operating system (not depicted). The hypervisor or the operating system can allocate the various resources available in the Computer System 301 and track the location of data in Memory 320 and of processes assigned to various CPUs 312. In embodiments that combine or rearrange elements, aspects of the logic modules' capabilities can be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
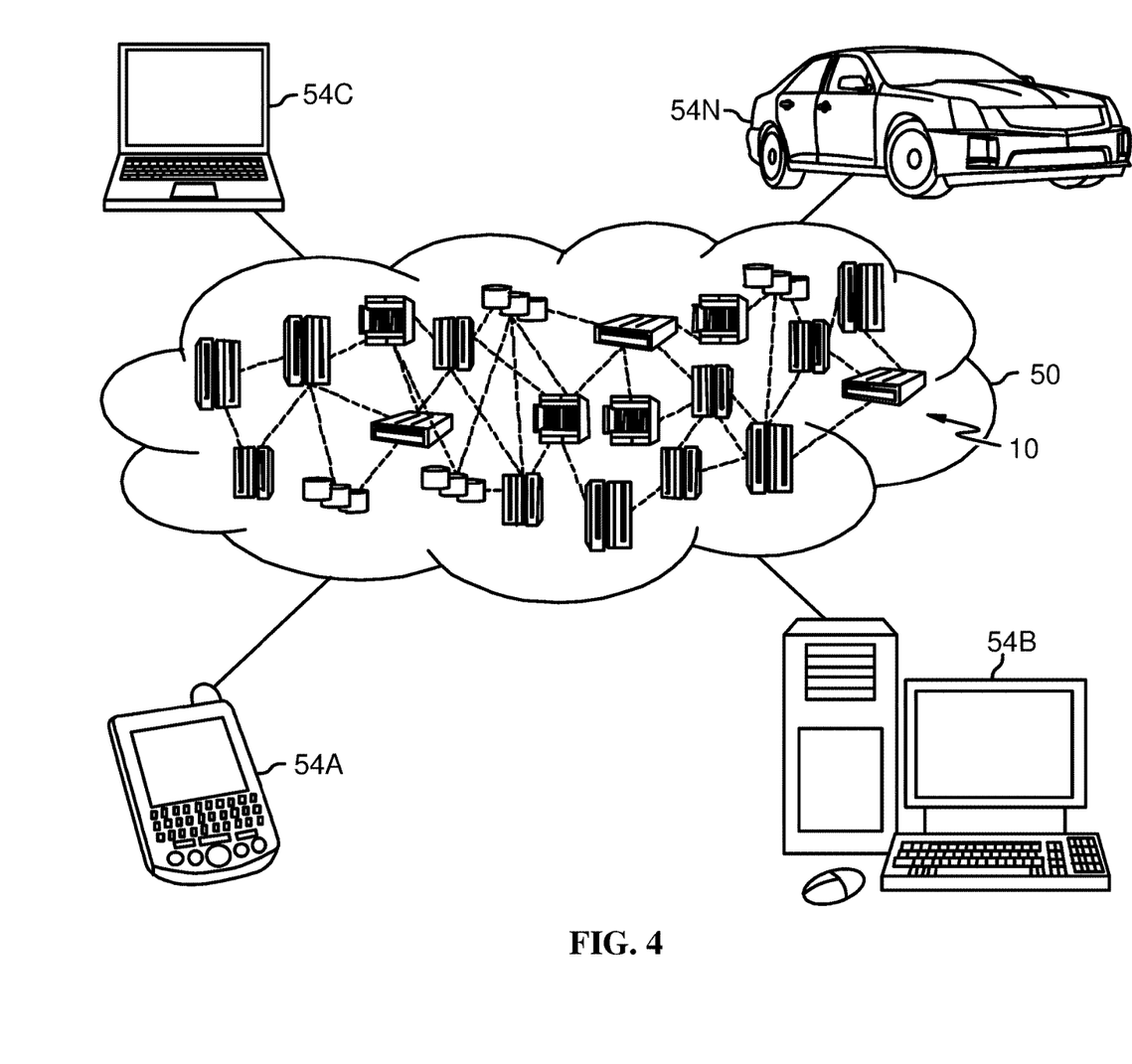
FIG. 4 depicts a cloud computing environment according to embodiments of the present disclosure.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
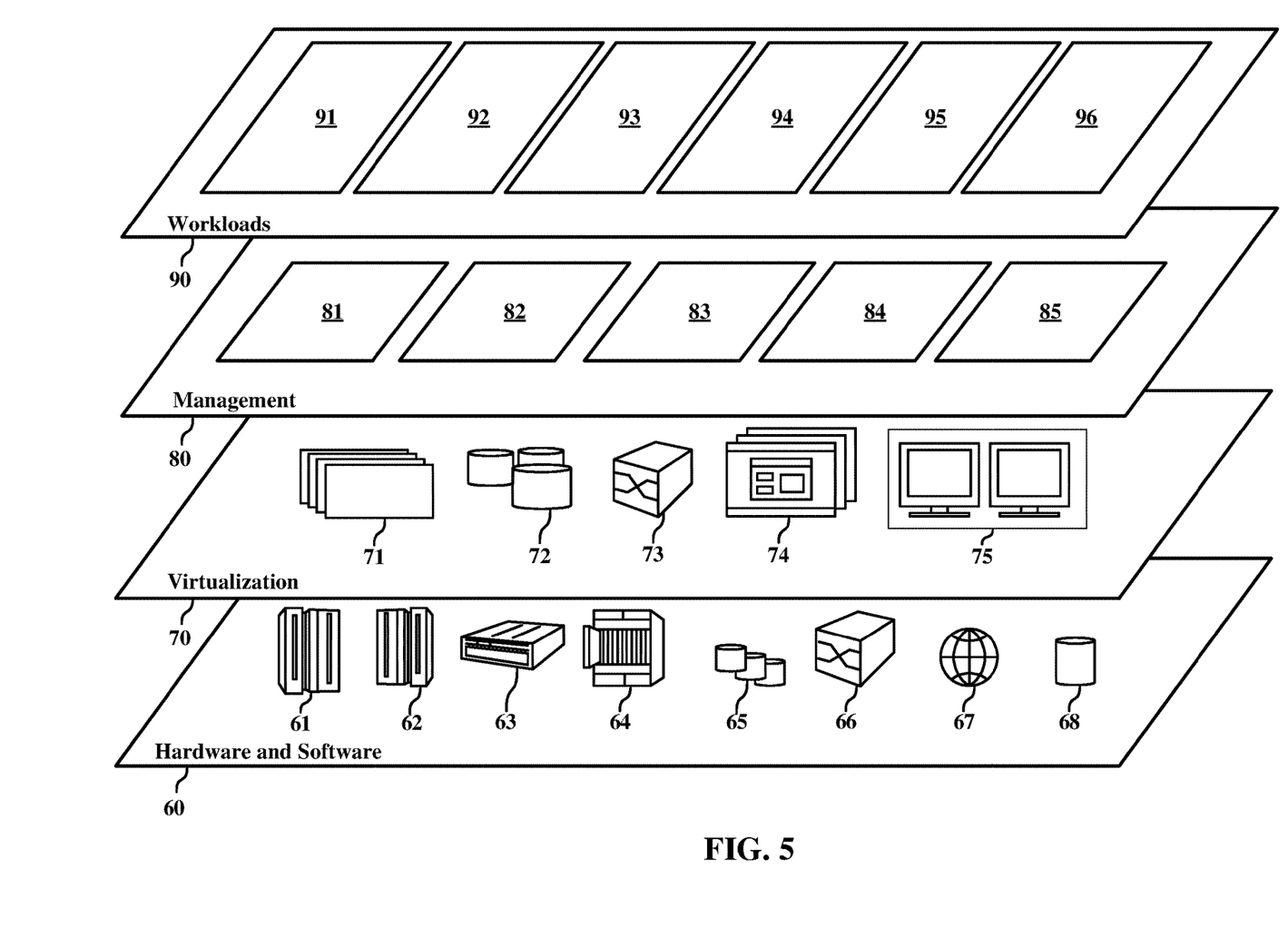
FIG. 5 depicts abstraction model layers according to embodiments of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and input translation logic 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining one or more gesture definitions, wherein each of the one or more gesture definitions identifies a correspondence between a set of gestures and a voice communication;
    detecting that a mute function of a communication device associated with a user is active, the mute function preventing the communication device from transmitting audio data to one or more receiving devices;
    obtaining, in response to the detecting, gesture data from one or more input devices: wherein the gesture data corresponds to gestures of the user tracked by the one or more input devices while the mute function is active;
    identifying, based on the gesture data, a first gesture definition of the one or more gesture definitions;
    determining that a difference between the first gesture definition and the gesture data exceeds a threshold; and
    initiating, based on the determining, an emission of an audio file storing the first voice communication from the communication device; and
    initiating a transfer of a first voice communication to the one or more receiving devices while the mute function is active, the first voice communication corresponding to the first gesture definition.

2. The computer-implemented method of claim 1, wherein the obtaining the gesture data comprises obtaining first gesture data from a first input device and obtaining second gesture data from a second input device;
    wherein the first gesture definition is identified based on the first gesture data;
    wherein the computer-implemented method further comprises;
    identifying, based on the second gesture data, a second gesture definition of the one or more gesture definitions; and
    initiating a transfer of a second voice communication to the one or more receiving devices, the second voice communication corresponding to the second gesture definition.

3. The computer-implemented method of claim 1, further comprising:
    determining that a difference between the first gesture definition and the gesture data exceeds a threshold;
    generating, based on the determining, a confirmation request; and
    displaying the confirmation request on the communication device.

4. The computer-implemented method of claim 1, wherein the obtaining the gesture data comprises obtaining the gesture data from the communication device.

5. The computer-implemented method of claim 1, wherein the one or more input devices is selected from the group consisting of a smart ring, a smart lens, and a smart shoe.

6. The computer-implemented method of claim 1, further comprising:
    initiating an emission of the first voice communication from the communication device.

7. The computer-implemented method of claim 1, wherein an audio file storing the first voice communication comprises a stored recording of a spoken message.

8. The computer-implemented method of claim 1, wherein the transfer of the first voice communication to the one or more receiving devices takes place while the mute function is active.

9. A system comprising:
    a processor; and
    a memory in communication with the processor, the memory containing program instructions that, when executed by the processor, are configured to cause the processor to perform a method, the method comprising:
    obtaining one or more gesture definitions, wherein each of the one or more gesture definitions identifies a correspondence between a set of gestures and a voice communication;
    detecting that a mute function of a communication device is active, the mute function preventing the communication device from transmitting audio data to one or more receiving devices;
    obtaining, in response to the detecting, gesture data from one or more input devices, wherein the gesture data corresponds to gestures of the user tracked by the one or more input devices while the mute function is active;
    identifying, based on the gesture data, a first gesture definition of the one or more gesture definitions;
    determining that a difference between the first gesture definition and the gesture data exceeds a threshold; and
    initiating, based on the determining, an emission of an audio file storing the first voice communication from the communication device; and
    initiating a transfer of a first voice communication to the one or more receiving devices while the mute function is active, the first voice communication corresponding to the first gesture definition.

10. The system of claim 9, wherein the obtaining the gesture data comprises obtaining first gesture data from a first input device and obtaining second gesture data from a second input device;
    wherein the first gesture definition is identified based on the first gesture data;
    wherein the method further comprises:

identifying, based on the second gesture data, a second gesture definition of the one or more gesture definitions; and initiating a transfer of a second voice communication to the one or more receiving devices, the second voice communication corresponding to the second gesture definition.

11. The system of claim 9, the method further comprising:

determining that a difference between the first gesture definition and the gesture data exceeds a threshold;

generating, based on the determining, a confirmation request; and displaying the confirmation request on the communication device.

12. The system of claim 9, wherein the obtaining the gesture data comprises obtaining the gesture data from the communication device.

13. The system of claim 9, wherein the one or more input devices is selected from the group consisting of a smart ring, a smart lens, and a smart shoe.

14. The system of claim 9, the method further comprising: initiating an emission of the first voice communication from the communication device.

15. A computer program product comprising a computer readable storage medium having program instructions embodied therewith, the program instructions executable by a processor to cause the processor to perform a method, the method comprising:

obtaining one or more gesture definitions, wherein each of the one or more gesture definitions identifies a correspondence between a set of gestures and a voice communication;

detecting that a mute function of a communication device is active, the mute function preventing the communication device from transmitting audio data to one or more receiving devices;

obtaining, in response to the detecting, gesture data from one or more input devices, wherein the gesture data corresponds to gestures of the user tracked by the one or more input devices while the mute function is active;

identifying, based on the gesture data, a first gesture definition of the one or more gesture definitions;

determining that a difference between the first gesture definition and the gesture data exceeds a threshold; and initiating, based on the determining, an emission of an audio file storing the first voice communication from the communication device; and initiating a transfer of a first voice communication to the one or more receiving devices while the mute function is active, the first voice communication corresponding to the first gesture definition.

16. The computer program product of claim 15, wherein the obtaining the gesture data comprises obtaining first gesture data from a first input device and obtaining second gesture data from a second input device;

wherein the first gesture definition is identified based on the first gesture data;

wherein the method further comprises:

identifying, based on the second gesture data, a second gesture definition of the one or more gesture definitions; and initiating a transfer of a second voice communication to the one or more receiving devices, the second voice communication corresponding to the second gesture definition.

17. The computer program product of claim 15, the method further comprising:

determining that a difference between the first gesture definition and the gesture data exceeds a threshold;

generating, based on the determining, a confirmation request; and displaying the confirmation request on the communication device.

18. The computer program product of claim 15, wherein the obtaining the gesture data comprises obtaining the gesture data from the communication device.

19. The computer program product of claim 15, the method further comprising: initiating an emission of the first voice communication from the communication device.

* * * * *